United States Patent
Riahi et al.

(10) Patent No.: US 10,113,532 B2
(45) Date of Patent: Oct. 30, 2018

(54) PRE-CURED COMPOSITES FOR ROTOR BLADE COMPONENTS

(71) Applicant: General Electric Company, Schenectady, NY (US)

(72) Inventors: Amir Riahi, Greenville, SC (US); Thomas Michael Moors, Greenville, SC (US); Eric Michael Shain, Simpsonville, SC (US); Shannon B. Geiger, Greenville, SC (US); Christopher Daniel Caruso, Greenville, SC (US); Aaron A. Yarbrough, Greenville, SC (US)

(73) Assignee: General Electric Company, Schenectady, NY (US)

(*) Notice: Subject to any disclaimer, the term of this patent is extended or adjusted under 35 U.S.C. 154(b) by 305 days.

(21) Appl. No.: 14/921,301

(22) Filed: Oct. 23, 2015

(65) Prior Publication Data

US 2017/0114773 A1  Apr. 27, 2017

(51) Int. Cl.
*F03D 1/06* (2006.01)
*B29C 70/52* (2006.01)
*B29C 70/44* (2006.01)
*B29L 31/08* (2006.01)

(52) U.S. Cl.
CPC .......... *F03D 1/0675* (2013.01); *B29C 70/44* (2013.01); *B29C 70/52* (2013.01); *B29L 2031/085* (2013.01); *F05B 2280/6003* (2013.01); *H05K 999/99* (2013.01); *Y02E 10/721* (2013.01); *Y02P 70/523* (2015.11)

(58) Field of Classification Search
CPC ........ F03D 1/0675; F03D 9/002; F03D 1/065; B29C 70/52; B29C 70/68; B29L 2031/085; Y10T 428/24529; B32B 3/10; B32B 3/28
USPC ............... 416/229 R; 428/161, 162, 163
See application file for complete search history.

(56) References Cited

U.S. PATENT DOCUMENTS

| | | | |
|---|---|---|---|
| 3,222,697 A * | 12/1965 | Scheermesser | A47C 27/144 297/452.48 |
| 6,264,877 B1 | 7/2001 | Pallu De La Barriere | |
| 7,090,911 B2 * | 8/2006 | Lascelles | B32B 3/28 428/120 |
| 7,473,385 B2 | 1/2009 | Stiesdal et al. | |
| 7,625,185 B2 | 12/2009 | Wobben | |
| 8,079,818 B2 | 12/2011 | Burchardt et al. | |
| 8,142,162 B2 | 3/2012 | Godsk et al. | |
| 8,168,027 B2 | 5/2012 | Jacobsen et al. | |
| 8,172,538 B2 | 5/2012 | Hancock et al. | |

(Continued)

FOREIGN PATENT DOCUMENTS

| | | |
|---|---|---|
| CA | 2526407 | 11/2012 |
| CN | 201155423 Y | 11/2008 |

(Continued)

*Primary Examiner* — Logan Kraft
*Assistant Examiner* — Brian Delrue
(74) *Attorney, Agent, or Firm* — Dority & Manning, P.A.

(57) ABSTRACT

The present disclosure is directed to pre-cured composites for use in manufacturing rotor blade components of a wind turbine. In one embodiment, the pre-cured composites are pultruded composites having a continuous base portion with a plurality of integral protrusions extending from the continuous base portion, and a fabric layer cured with the continuous base portion. Further, adjacent protrusions are separated by a gap.

16 Claims, 9 Drawing Sheets

(56) References Cited

U.S. PATENT DOCUMENTS

| | | | |
|---|---|---|---|
| 8,297,932 | B2 | 10/2012 | Arocena De La Rua et al. |
| 8,317,479 | B2 | 11/2012 | Vronsky et al. |
| 8,348,622 | B2 | 1/2013 | Bech |
| 8,353,674 | B2 | 1/2013 | Bech |
| 8,506,258 | B2 | 8/2013 | Baker et al. |
| 8,511,996 | B2 | 8/2013 | Llorente Gonzalez et al. |
| 8,540,491 | B2 | 9/2013 | Gruhn et al. |
| 8,657,581 | B2 | 2/2014 | Pilpel et al. |
| 8,673,106 | B1 | 3/2014 | Jolley et al. |
| 8,747,098 | B1 | 6/2014 | Johnson et al. |
| 8,826,534 | B2 | 9/2014 | Cappelli et al. |
| 8,961,142 | B2 | 2/2015 | Wansink |
| 8,992,813 | B2 | 3/2015 | Robbins et al. |
| 2009/0148300 | A1 | 6/2009 | Driver et al. |
| 2011/0045276 | A1 | 2/2011 | Grove-Nielsen |
| 2011/0187115 | A1* | 8/2011 | Piasecki ............... B23P 15/04 290/55 |
| 2011/0318186 | A1 | 12/2011 | Kristensen et al. |
| 2012/0039720 | A1 | 2/2012 | Bech |
| 2012/0180582 | A1 | 7/2012 | Piasecki |
| 2012/0230830 | A1 | 9/2012 | Lind et al. |
| 2012/0237356 | A1 | 9/2012 | Mironov |
| 2013/0022466 | A1 | 1/2013 | Laurberg |
| 2013/0108453 | A1 | 5/2013 | Baker et al. |
| 2013/0129518 | A1 | 5/2013 | Hayden et al. |
| 2013/0149166 | A1 | 6/2013 | Schibsbye |
| 2013/0164133 | A1 | 6/2013 | Grove-Nielsen |
| 2013/0195661 | A1 | 8/2013 | Lind et al. |
| 2013/0333823 | A1 | 12/2013 | Hedges et al. |
| 2014/0003956 | A1 | 1/2014 | Lull et al. |
| 2014/0023513 | A1 | 1/2014 | Johnson et al. |
| 2014/0030094 | A1 | 1/2014 | Dahl et al. |
| 2014/0119936 | A1 | 5/2014 | Dahl et al. |
| 2014/0295187 | A1 | 10/2014 | Jacobsen et al. |
| 2015/0023799 | A1* | 1/2015 | Wetzel ............... F03D 1/0675 416/226 |

FOREIGN PATENT DOCUMENTS

| | | |
|---|---|---|
| CN | 100476200 C | 4/2009 |
| CN | 101725481 A | 6/2010 |
| CN | 101906251 A | 12/2010 |
| CN | 101302302 B | 2/2011 |
| CN | 101194102 B | 4/2012 |
| CN | 102459881 A | 5/2012 |
| CN | 102705157 A | 10/2012 |
| DE | 102011051172 A1 | 12/2012 |
| DE | 102012219224 B3 | 3/2014 |
| DK | 201270816 A | 1/2014 |
| DK | 201270818 A | 1/2014 |
| EP | 2113373 B1 | 1/2011 |
| EP | 2255957 B1 | 7/2013 |
| EP | 2679804 A1 | 1/2014 |
| EP | 2679806 A1 | 1/2014 |
| EP | 2682256 A1 | 1/2014 |
| GB | 2451192 A | 1/2009 |
| GB | 2455044 A | 6/2009 |
| JP | 2007092716 A | 4/2007 |
| JP | 3930200 B2 | 6/2007 |
| JP | 2011032987 A | 2/2011 |
| JP | 2011038518 A | 2/2011 |
| JP | 5439412 B2 | 3/2014 |
| WO | WO 03/082551 A1 | 10/2003 |
| WO | WO 2010/025830 A2 | 3/2010 |
| WO | WO 2010/057502 A3 | 5/2010 |
| WO | WO 2011/088835 A2 | 7/2011 |
| WO | WO 2012/042261 A1 | 4/2012 |
| WO | WO 2012/140039 A2 | 10/2012 |
| WO | WO 2013/007351 A1 | 1/2013 |
| WO | WO 2013/060582 A1 | 5/2013 |
| WO | WO 2013/178228 A1 | 12/2013 |
| WO | WO 2014/044280 A1 | 3/2014 |
| WO | WO2014/049354 A1 | 4/2014 |
| WO | WO 2014/063944 A1 | 5/2014 |
| WO | WO 2015/015202 A1 | 2/2015 |
| WO | WO 2015/070876 A1 | 5/2015 |

* cited by examiner

PRE-CURED COMPOSITES FOR ROTOR BLADE COMPONENTS

FIELD OF THE INVENTION

The present subject matter relates generally to rotor blades of a wind turbine and, more particularly, to pre-cured rotor blade components having a toothed configuration.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding edges of the rotor blade. In general, the body shell is relatively lightweight and has structural properties (e.g., stiffness, buckling resistance and strength) which are not configured to withstand the bending moments and other loads exerted on the rotor blade during operation. In addition, wind turbine blades are becoming increasingly longer in order to produce more power. As a result, the blades must be stiffer and thus heavier so as to mitigate loads on the rotor.

Figure 1:
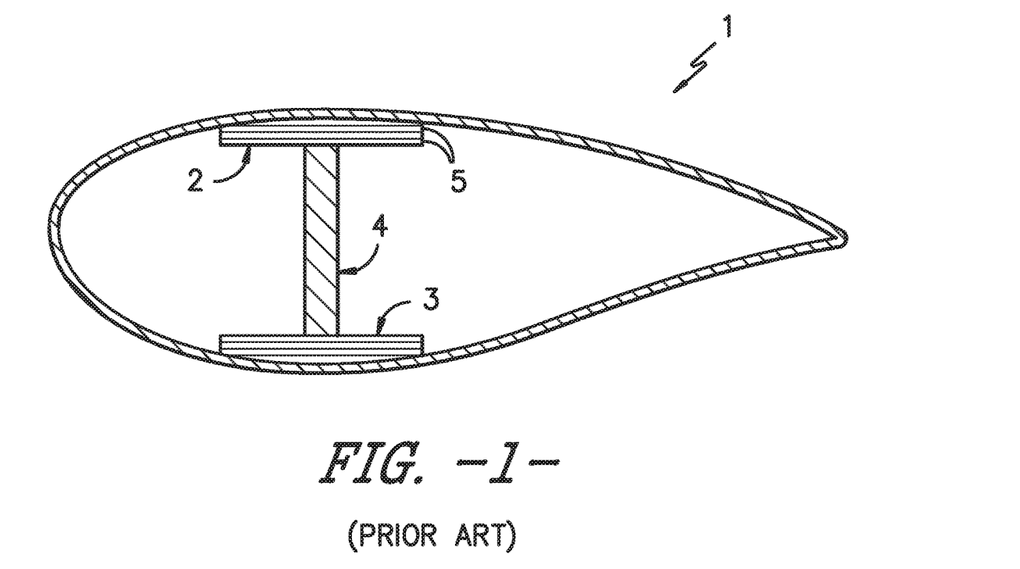
FIG. 1 illustrates a cross-sectional view of an example rotor blade of a wind turbine according to conventional construction.

To increase the stiffness, buckling resistance, and/or strength of the rotor blade, the body shell is typically reinforced using one or more structural components (e.g. opposing spar caps with a shear web configured therebetween) that engage the inner surfaces of the shell halves. For example, as shown in FIG. 1, a cross-sectional view of a conventional rotor blade 1 is illustrated. As shown, the shear web 4 extends between the opposing spar caps 2, 3 so as to reinforce the rotor blade 1. Wind turbine spar caps are typically constructed of fiber laminate composites, which can be difficult to control, defect prone, and/or highly labor intensive due to handling of the dry and pre-preg fabrics and the challenges of infusing large laminated structures.

As such, certain spar caps can be constructed of pre-fabricated, pre-cured (i.e. pultruded) composites that can be produced in thicker sections, and are less susceptible to defects. Accordingly, the pultruded composites can eliminate various concerns and challenges associated with using dry fabric alone. As used herein, the terms "pultruded composites," "pultrusions," "pultruded members" or similar generally encompass reinforced materials (e.g. fibers or woven or braided strands) that are impregnated with a resin and pulled through a stationary die such that the resin cures or undergoes polymerization through added heat or other curing methods. As such, the process of manufacturing pultruded composites is typically characterized by a continuous process of composite materials that produces composite parts having a constant cross-section. Thus, as shown in FIG. 1, a plurality of pultrusions, e.g. pultruded plates 5, can be arranged together to form the spar caps 2, 3 and/or various other rotor blade components.

Figure 2:
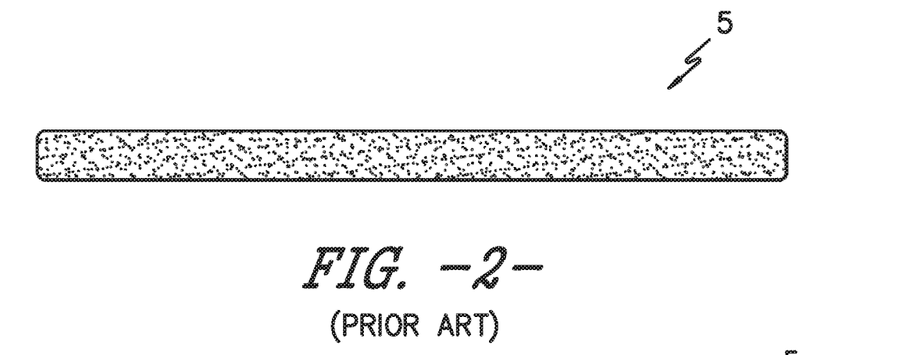
FIG. 2 illustrates a cross-sectional view of an example pultruded composite according to conventional construction.
Figure 3:
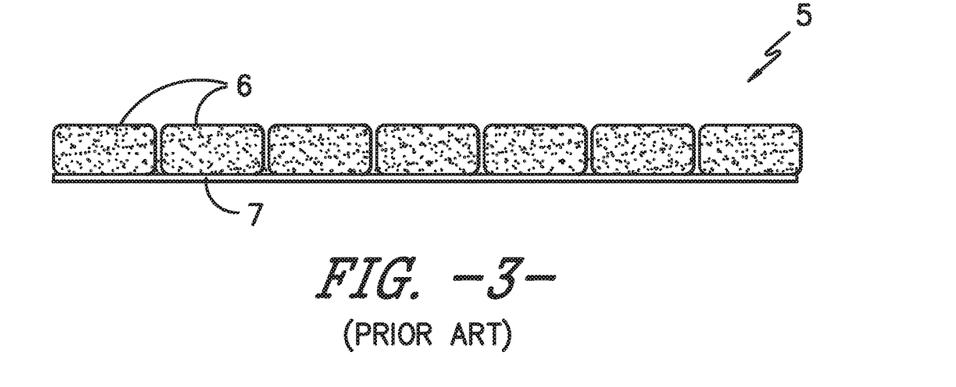
FIG. 3 illustrates a cross-sectional view of another example pultruded composite according to conventional construction.

More specifically, as shown in FIG. 2, one example pultruded composite 5 that may be utilized in a spar cap 2, 3 of the rotor blade 1 is illustrated, with the pultruded composite 5 having a solid board configuration. Such a configuration, however, is not easily contourable or formable to the blade surface of the rotor blade 1. Thus, as shown in FIG. 3, another example pultruded composite 5 that may be utilized in a spar cap 2, 3 of the rotor blade 1 is illustrated, having a plurality of pultrusions 6 secured together via a skin layer 7. Though the pultruded composite 5 of FIG. 3 may be more contourable to the blade surface of the rotor blade 1 than the composite 5 of FIG. 2, such a configuration can be time-consuming and expensive to manufacture.

Accordingly, the art is continuously seeking new and improved methods of manufacturing rotor blade components, such as the spar caps, using pre-cured composites. Thus, the present disclosure is directed to methods of manufacturing rotor blade components with pultruded composites having a toothed configuration.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a rotor blade component for a rotor blade of a wind turbine. For example, in one embodiment, the rotor blade component is constructed of at least one pre-cured composite, e.g. a pultruded composite, having a continuous base portion with a plurality of integral protrusions, e.g. teeth, extending therefrom and a fabric layer cured with the continuous base portion. Further, adjacent protrusions are separated by a gap so as to provide flexibility to the pre-cured composite.

The rotor blade component(s) described herein may include any suitable blade component. For example, in one embodiment, the rotor blade component may include a spar cap, a shear web, or an airflow modifying element of the rotor blade.

In another embodiment, the pre-cured composite may be a pultruded composite. In such embodiments, the pultruded composite may include one or more fiber materials cured within at least one resin material. Further, in such embodiments, the fabric layer may be co-pultruded with the continuous base portion. In addition, the one or more fiber materials may include at least one of glass fibers, carbon fibers, metal fibers, polymer fibers, ceramic fibers, nanofibers, or combinations thereof. Further, the resin material may include at least one of a thermoplastic material or a thermoset material.

In additional embodiments, at least a portion of the protrusions may be spaced equally apart. For example, in one embodiment, all of the protrusions may be spaced equally apart. Alternatively, at least a portion of the protrusions may be randomly spaced apart.

In further embodiments, each of the plurality of protrusions may have an equal cross-sectional area. Alternatively, the plurality of protrusions may have varying cross-sectional areas. In addition, in certain embodiments, the protrusions may have any suitable cross-sectional shape, including but not limited to square, rectangle, dovetail, or similar.

In yet another embodiment, the rotor blade component may further include a plurality of pre-cured composites arranged in a plurality of layers and secured together, e.g. via vacuum infusion.

In another aspect, the present disclosure is directed to a method of forming a pultruded composite for use in manufacturing a rotor blade component of a wind turbine. The method includes impregnating one or more fiber materials with a resin material. The method also includes pulling the impregnated fiber materials through a die having a predetermined die shape. More specifically, the predetermined die shape is configured to form a pultruded composite having a continuous base portion with a plurality of protrusions extending from the continuous base portion, wherein adjacent protrusions are separated by a gap. Further, the method includes curing the pultruded composite.

In one embodiment, the method also includes co-pultruding a fabric layer with the impregnated fiber material through the die such that the fabric layer is adjacent to the continuous base portion.

In yet another aspect, the present disclosure is directed to a method of manufacturing a rotor blade component of a wind turbine. The method includes impregnating one or more fiber materials with a resin material. The method also includes pultruding the impregnated fiber materials through a die having a predetermined die shape so as to form a plurality of pultruded composites. The predetermined die shape is configured to form a pultruded composite having a continuous base portion with a plurality of protrusions extending from the continuous base portion, wherein adjacent protrusions are separated by a gap. The method also includes curing the plurality of pultruded composites. Further, the method includes arranging the cured pultruded composites in a mold of the rotor blade component. The method also includes infusing the cured pultruded composites together within the mold so as to form the rotor blade component.

In one embodiment, the mold of the rotor blade component may include a spar cap mold, a shear web mold, an airflow modifying element mold, or any other suitable rotor component mold. In another embodiment, the method may also include co-pultruding a fabric layer with the impregnated fiber material through the die such that the fabric layer is adjacent to the continuous base portion.

In additional embodiments, the step of arranging the plurality of pultruded composites in the mold may include (a) arranging a first pultruded composite such that a plurality of protrusions of the first pultruded composite is in an upright position, (b) arranging a second pultruded composite atop the first pultruded composite such that a plurality of protrusions of the second pultruded composite is in an upright position, and (c) repeating (a) through (b) until a predetermined stiffness is reached so as to form the rotor blade component.

Alternatively, the step of arranging the plurality of pultruded composites in the mold may include (a) arranging a first pultruded composite such that a plurality of protrusions of the first pultruded composite is in an upright position, (b) arranging a second pultruded composite atop the first pultruded composite such that a plurality of protrusions of the second pultruded composite is in an opposite, downward position, and (c) repeating (a) through (b) until a predetermined stiffness is reached so as to form the rotor blade component.

In still another embodiment, the step of arranging the plurality of pultruded composites in the mold of the rotor blade component may also include arranging a first pultruded composite with a plurality of protrusions of the first pultruded composite in an upright position and arranging a second pultruded composite with a plurality of protrusions of the second pultruded composite in a downward position such that the protrusions of the second pultruded composite fit within gaps created by the protrusions of the first pultruded composite. Thus, the arranged first and second pultruded components form a solid pultruded composite.

Thus, in further embodiments, the method may also include layering a plurality of solid pultruded composites in a stacked configuration until a predetermined stiffness is obtained so as to form the rotor blade component. In yet another embodiment, the method may include placing an intermediate layer of material between one or more of the stacked solid pultruded composites.

In addition, in certain embodiments, the step of infusing the plurality of pultruded composites together within the mold so as to form the rotor blade component may include vacuum infusion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to pre-cured composites for use in manufacturing rotor blade components of a wind turbine. For example, in one embodiment, the pre-cured composites are pultruded composites having a continuous base portion with a plurality of integral protrusions or teeth extending from the continuous base portion, and a fabric layer cured or co-pultruded with the continuous base portion. Further, adjacent protrusions of the pre-cure composite are separated by a gap. Thus, the pre-cured composites can be easily arranged and secured together to form a blade component that is easily contourable and formable, e.g. to a blade surface of the rotor blade.

The present disclosure provides many advantages not present in the prior art. For example, the rotor blade components of the present disclosure are less prone to defects. Further, since the rotor blade components of the present disclosure are pre-cured, wrinkling and dis-bonding of the layers of the component are reduced and/or eliminated. In addition, the rotor blade components (e.g. spar caps) have improved contourability and are more flexible than prior art components. Moreover, the rotor blade components of the present disclosure are less expensive to manufacture than prior art methods.

Figure 4:
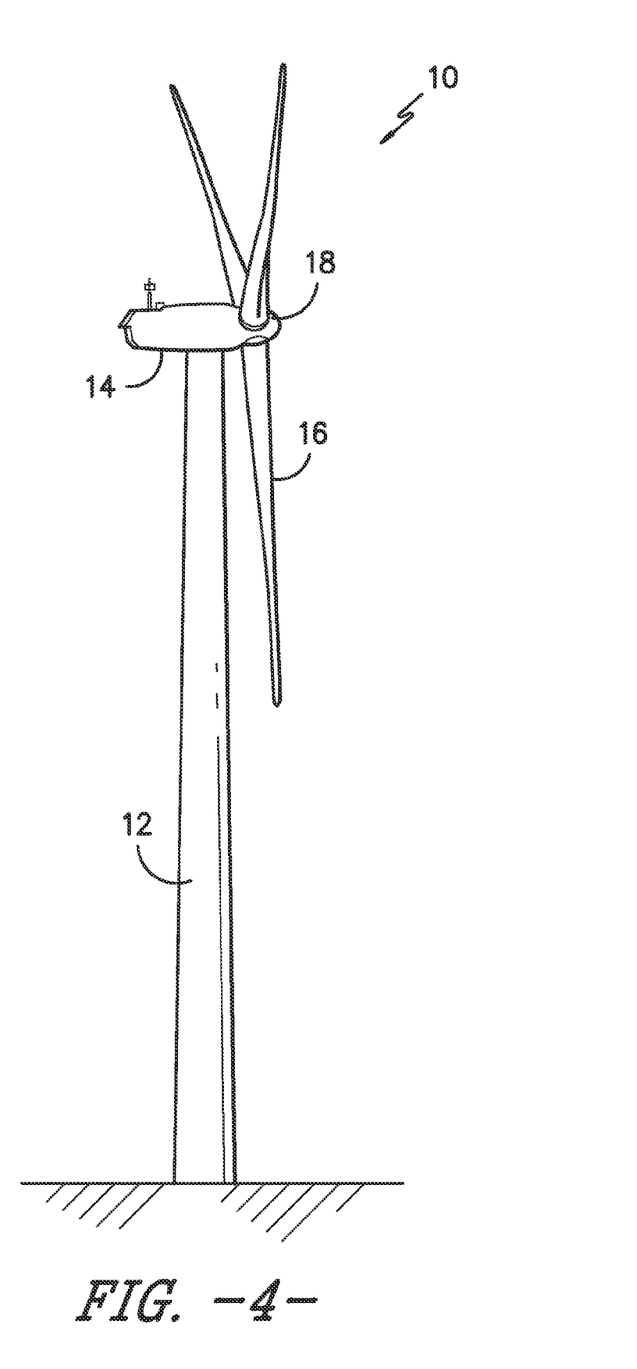
FIG. 4 illustrates a perspective view of one embodiment of a wind turbine according to the present disclosure.

Referring now to the drawings, FIG. 4 illustrates a perspective view of a horizontal axis wind turbine 10. It should be appreciated that the wind turbine 10 may also be a vertical-axis wind turbine. As shown in the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes one or more rotor blades 16 coupled to and extending radially outward from the hub 18. As shown, the rotor hub 18 includes three rotor blades 16. However, in an alternative embodiment, the rotor hub 18 may include more or less than three rotor blades 16. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Figure 5:
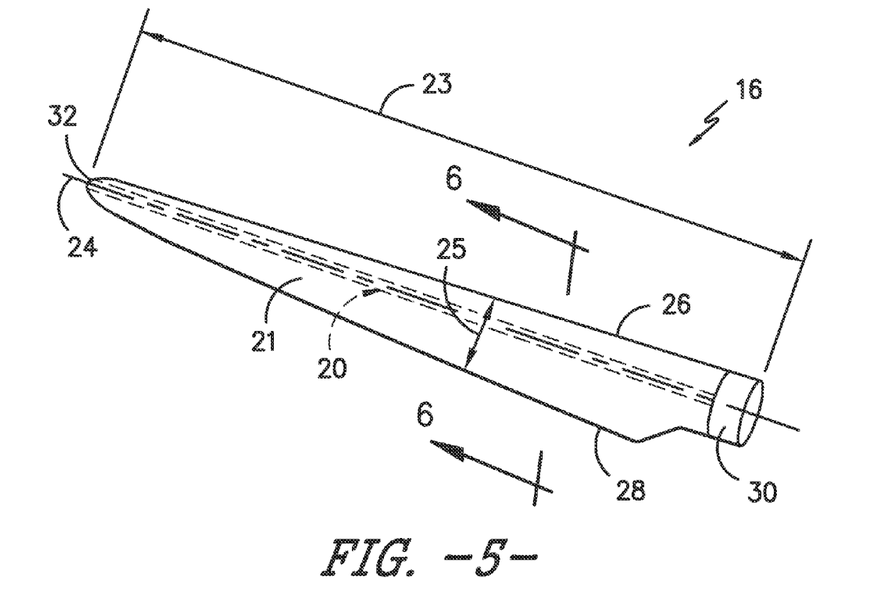
FIG. 5 illustrates a perspective view of one of the rotor blades of FIG. 4.
Figure 6:
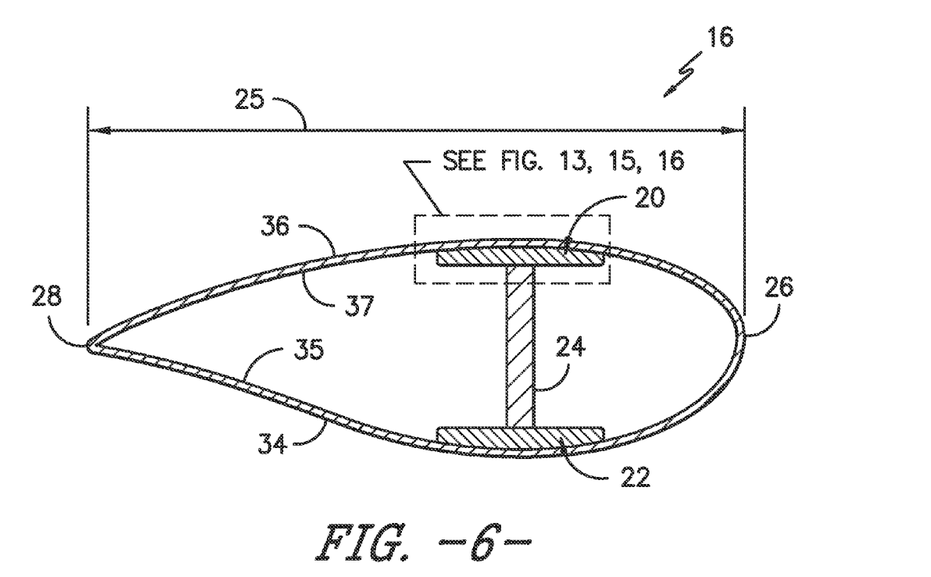
FIG. 6 illustrates a cross-sectional view of the rotor blade of FIG. 5 along line 6-6.

Referring to FIGS. 5 and 6, one of the rotor blades 16 of FIG. 4 is illustrated in accordance with aspects of the present subject matter. In particular, FIG. 5 illustrates a perspective view of the rotor blade 16, whereas FIG. 6 illustrates a cross-sectional view of the rotor blade 16 along the sectional line 6-6 shown in FIG. 5. As shown, the rotor blade 16 generally includes a blade root 30 configured to be mounted or otherwise secured to the hub 18 (FIG. 4) of the wind turbine 10 and a blade tip 32 disposed opposite the blade root 30. A body shell 21 of the rotor blade generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing ends 26, 28 of the rotor blade 16. Further, the rotor blade 16 may also have a span 23 defining the total length between the blade root 30 and the blade tip 32 and a chord 25 defining the total length between the leading edge 26 and the trailing edge 28. As is generally understood, the chord 25 may generally vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components. For example, the body shell 21 may be manufactured from a first shell half generally defining the pressure side 34 of the rotor blade 16 and a second shell half generally defining the suction side 36 of the rotor blade 16, with such shell halves being secured to one another at the leading and trailing ends 26, 28 of the blade 16. Additionally, the body shell 21 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 6, the rotor blade 16 may also include one or more longitudinally extending structural components configured to provide increased stiffness, buckling resistance and/or strength to the rotor blade 16. For example, the rotor blade 16 may include a pair of longitudinally extending spar caps 20, 22 configured to be engaged against the opposing inner surfaces 35, 37 of the pressure and suction sides 34, 36 of the rotor blade 16, respectively. Additionally, one or more shear webs 24 may be disposed between the spar caps 20, 22 so as to form a beam-like configuration. The spar caps 20, 22 may generally be designed to control the bending stresses and/or other loads acting on the rotor blade 16 in a generally span-wise direction (a direction parallel to the span 23 of the rotor blade 16) during operation of a wind turbine 10. Similarly, the spar caps 20, 22 may also be designed to withstand the span-wise compression occurring during operation of the wind turbine 10.

Referring now to FIGS. 7-16, the rotor blade components, e.g. the spar caps 20, 22, as described herein can be formed using one or more pre-cured composites 40 according to the present disclosure. Thus, it should be understood that the pre-cured composites 40 of the present disclosure may be used to manufacture any other suitable rotor blade components in addition the spar caps 20, 22. For example, in addition to spar caps 20, 22, the rotor blade components may include a shear web 24 of the rotor blade 16, an airflow modifying element, blade extensions, or similar.

Figure 7:
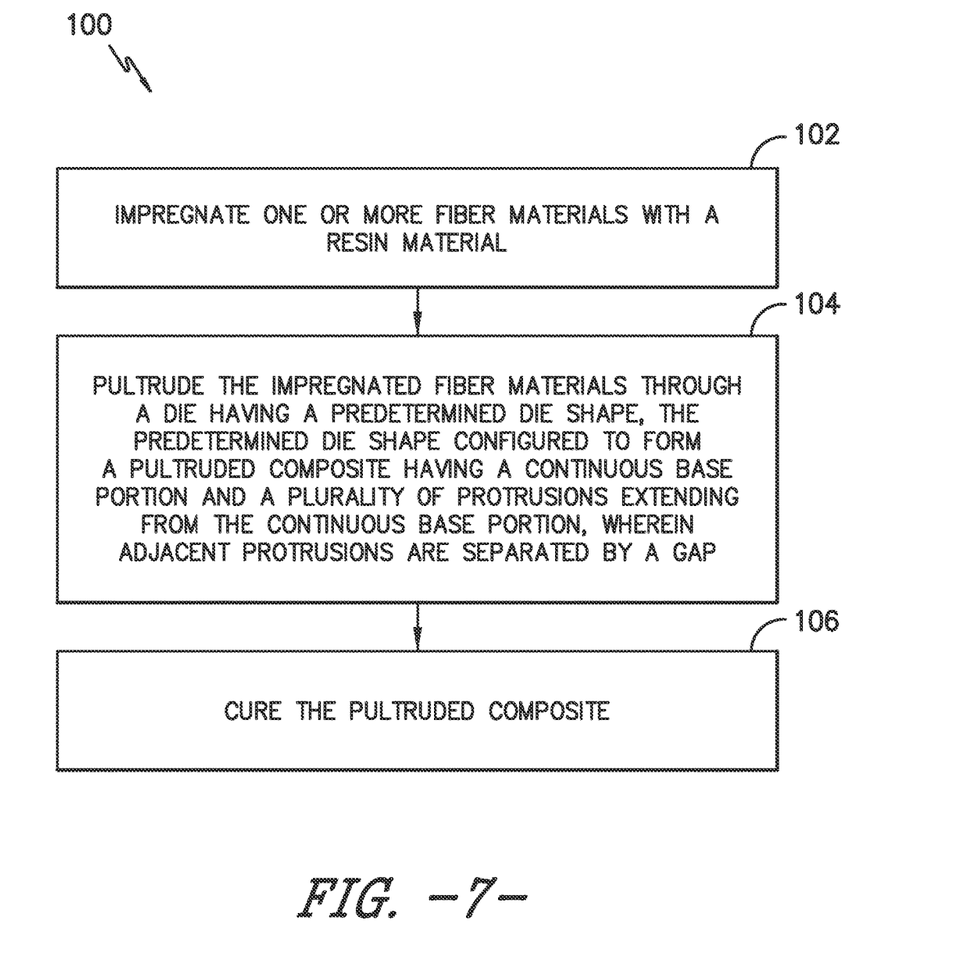
FIG. 7 illustrates a flow diagram of one embodiment of a method for manufacturing a pre-cured composite for use in manufacturing a rotor blade components for a wind turbine according to the present disclosure.
Figure 8:
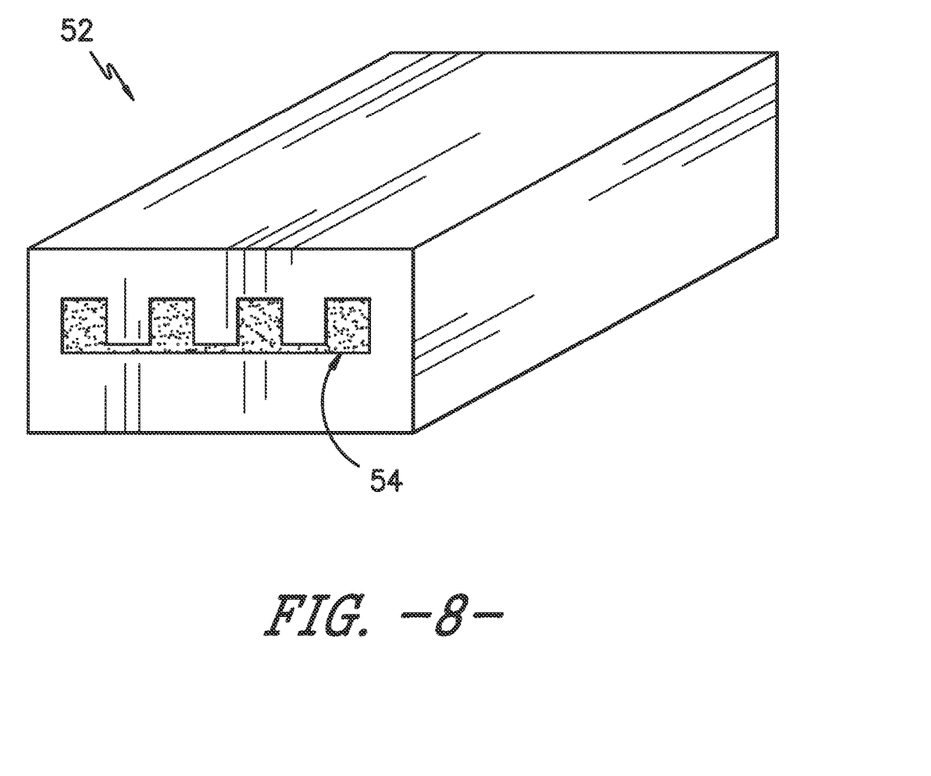
FIG. 8 illustrates a perspective view of one embodiment of a die for manufacturing a pre-cured composite for a rotor blade component of a wind turbine according to the present disclosure.

Referring specifically to FIG. 7, a flow diagram of one embodiment of forming a pre-cured composite 40 for use in manufacturing a rotor blade component of a wind turbine 10 is illustrated. As shown at 102, the method 100 includes impregnating one or more fiber materials with a resin material. As shown at 104, the method 100 includes pultruding the impregnated fiber materials through a die 52 having a predetermined die shape 54 (FIG. 8). More specifically, as shown, the predetermined die shape 54 is configured to form a pre-cured composite 40 having a continuous base portion 42 with a plurality of protrusions 44 extending from the continuous base portion 42, wherein adjacent protrusions 44 are separated by a gap 48. (FIGS. 9-11).

Thus, in certain embodiments, the pre-cured composites 40 of the present disclosure may constructed via a pultrusion process. As used herein, "pultrusion" describes a process for manufacturing reinforced materials that are impregnated with a resin and pulled through a stationary die such that the resin cures or undergoes polymerization through added heat or other curing methods. As such, pultruded composites are typically characterized by a continuous process of composite materials that produces composite parts having a constant cross-section.

Figure 10:
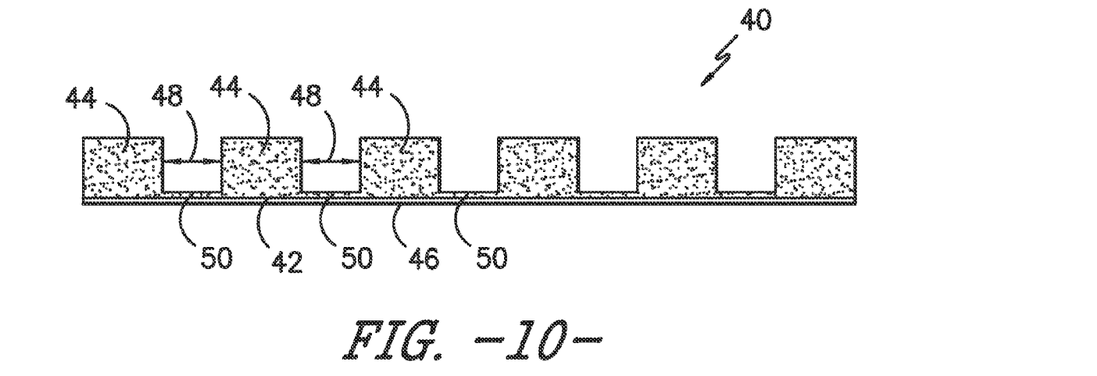
FIG. 10 illustrates a cross-sectional view of another embodiment of a pre-cured composite for a rotor blade component of a wind turbine according to the present disclosure.

As such, in certain embodiments, the method 100 may also include co-pultruding a fabric layer 46 with the impregnated fiber material through the die 54 such that the fabric layer 46 is adjacent to the continuous base portion 42 (FIG. 10). Further, as shown at 106, the method 100 includes curing the pultruded composite 40, e.g. via heating.

Figure 9:
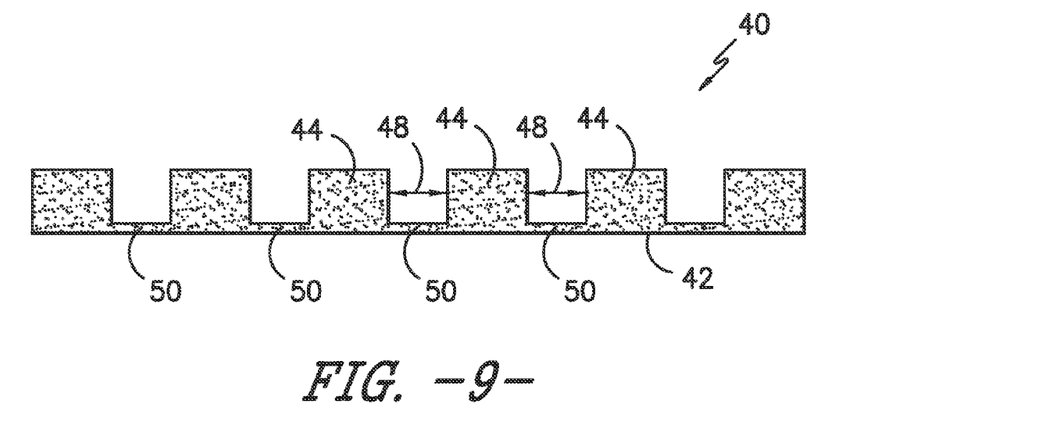
FIG. 9 illustrates a cross-sectional view of one embodiment of a pre-cured composite for a rotor blade component of a wind turbine according to the present disclosure.
Figure 11:
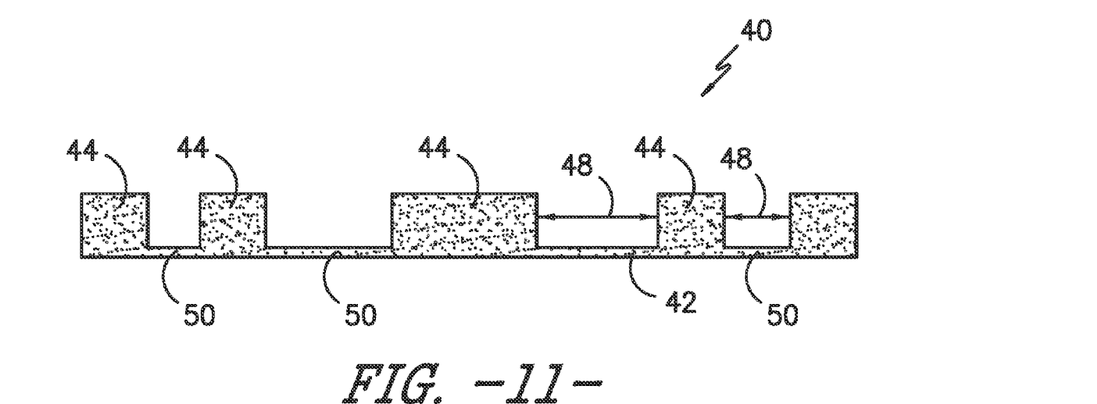
FIG. 11 illustrates a cross-sectional view of yet another embodiment of a pre-cured composite for a rotor blade component of a wind turbine according to the present disclosure.

More specifically, as shown in FIGS. 9-11, various cross-sectional views of a pre-cured composite 40 manufactured according to the present disclosure are illustrated. As shown, the pre-cured composite 40 includes a continuous base portion 42 with a plurality of integral protrusions 44 extending from the continuous base portion 42. As used herein, the term "continuous" when referring, for example, to the base portion 42 generally encompasses a continuously, uninterrupted, smooth surface. In contrast, as shown in FIGS. 9 and 10, the surface opposite the continuous base portion 42, i.e. the surface containing the protrusions 44 or interruptions, is discontinuous or unsmooth. Further, as shown, adjacent protrusions 44 of the pre-cured composite 40 are separated by a gap 48 so as to provide flexibility to the pre-cured composite 40. More specifically, as shown, the gaps 48 create one or more thin sections 50 in the pre-cured composites 40 that allow the composite to be more contourable and/or formable to a blade surface.

In addition, as shown in FIG. 10 and as mentioned above, the pre-cured composite 40 may also include a fabric layer 46 cured with the continuous base portion 42. More specifically, in certain embodiments, where the pre-cured composite 40 is a pultruded composite, the fabric layer 46 may be co-pultruded with the continuous base portion 42. Thus, the fabric layer 46 is configured to provide support of the fiber tows in the thin sections 50 of the pre-cured composites 40.

In additional embodiments, as shown in FIGS. 9-10, at least a portion of the protrusions 44 may be spaced equally apart. For example, as shown, all of the protrusions 44 may be spaced equally apart. Alternatively, as shown in FIG. 11, at least a portion of the protrusions 44 may be randomly spaced apart.

In further embodiments, as shown in FIGS. 9-10, each of the protrusions 44 may have an equal cross-sectional area. Alternatively, as shown in FIG. 11, the protrusions may have varying cross-sectional areas. For example, as shown in FIG. 11, the middle protrusion 44 has a larger cross-sectional area than the side protrusions 44. Still additional embodiments may include any combination of cross-sectional areas and/or gap size in addition to those embodiments depicted. In addition, the protrusions 44 may have any suitable cross-sectional shape. For example, in certain embodiments, the cross-sectional shape protrusions 44 may include, but are not limited to square, rectangle, dovetail, or similar.

Further, it should be understood that the pre-cured members 40 of the present disclosure are pre-fabricated components manufactured using any suitable methods known in the art. Thus, in accordance with certain aspects of the present disclosure, a plurality of pultruded members 40 can be then joined together to form the rotor blade component, e.g. the spar caps 20, 22.

Figure 12:
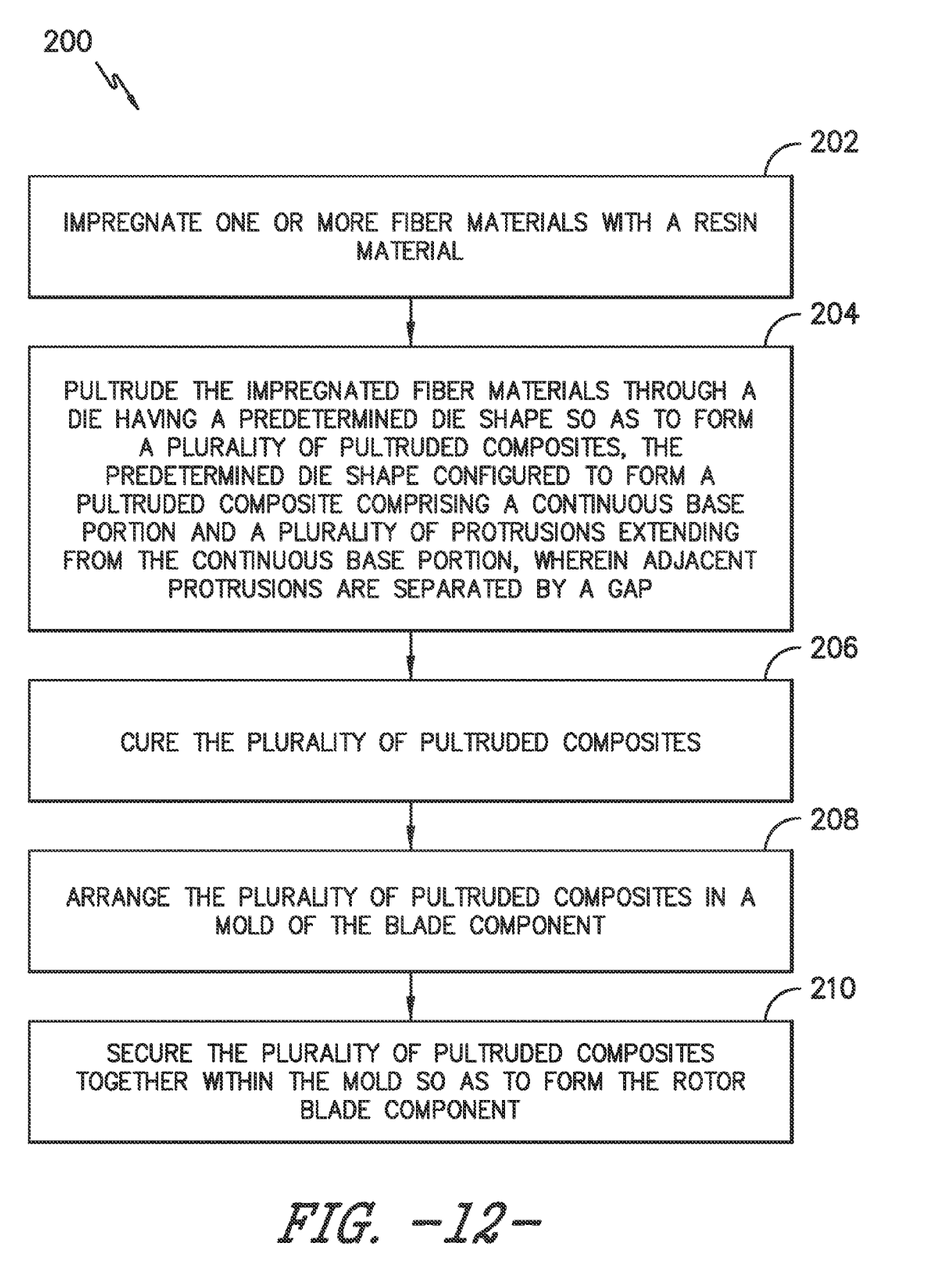
FIG. 12 illustrates a flow diagram of one embodiment of a method of manufacturing a rotor blade component for a wind turbine according to the present disclosure.

More specifically, as shown in FIG. 12, a flow diagram of one embodiment of a method 200 of manufacturing a rotor blade component, e.g. one of the spar caps 20, 22, of a wind turbine 10 is illustrated. As shown at 202, the method 200 includes impregnating one or more fiber materials with a resin material. As shown at 204, the method 200 includes pulling or pultruding the impregnated fiber materials through a die 52 (FIG. 8) having a predetermined die shape 54 so as to form a plurality of pultruded composites 40. Further, as shown, the predetermined die shape 54 is configured to form a pultruded composite 40 having a continuous base portion 42 with a plurality of protrusions 44 extending from the continuous base portion 42, wherein adjacent protrusions 44 are separated by a gap 48. Thus, as shown at 206, the method 200 may also include curing the plurality of pultruded composites 40.

Figure 13:
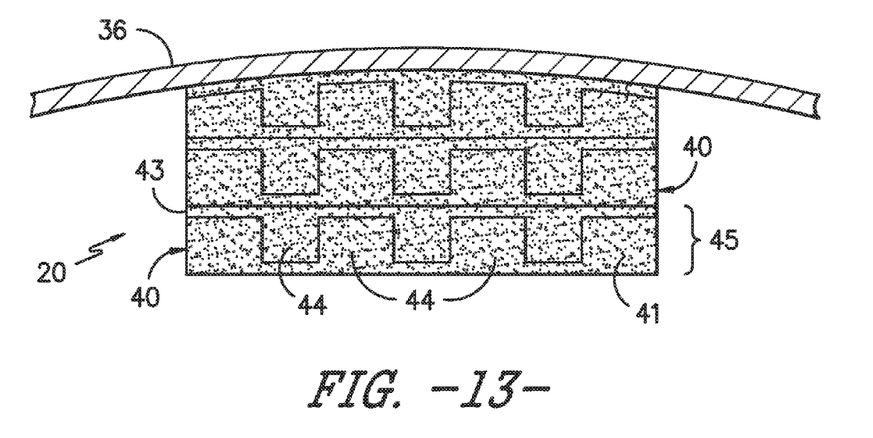
FIG. 13 illustrates a detailed, cross-sectional view of one embodiment of the spar cap of FIG. 6.
Figure 14:
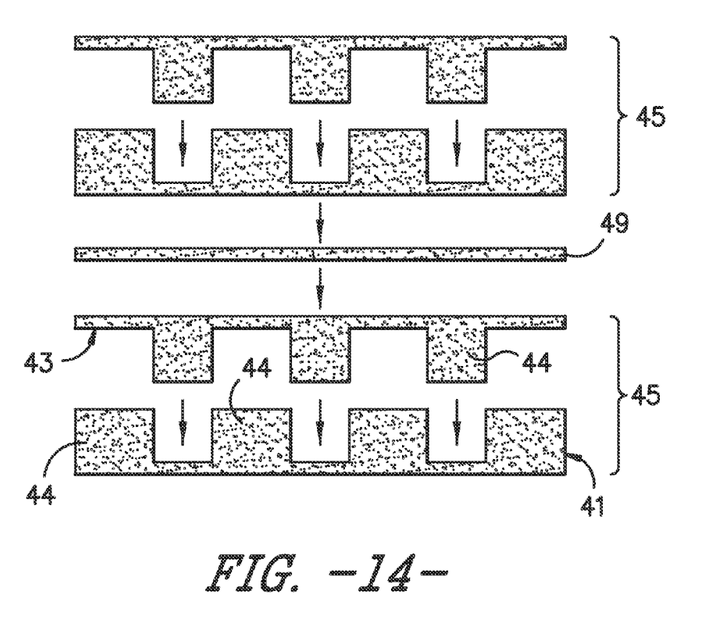
FIG. 14 illustrates an exploded view of one embodiment of an assembly process for arranging pre-cured composites together to form the spar cap of FIG. 13.

In addition, as shown at 208, the method 200 includes arranging the plurality of pultruded composites 40 in a mold of the rotor blade component. For example, in one embodiment, the rotor blade component may formed by arranging a plurality of the pre-cured composites 40 as described herein in a plurality of layers (FIGS. 13-16). More specifically, as shown in FIGS. 13 and 14, the step of arranging the plurality of pultruded composites 40 in the mold of the rotor blade component may include arranging a first pultruded composite 41 with the plurality of protrusions 44 in an upright position and arranging a second pultruded composite 43 with the plurality of protrusions 43 in a downward position such that the protrusions 44 of the second pultruded composite 43 fit within the gaps between the protrusions 44 of the first pultruded composite 41. Thus, as shown, the arranged first and second pultruded components 41, 43 form a solid pultruded composite 45. Further, as shown in FIG. 14, the method 200 may also include layering a plurality of solid pultruded composites 45 in a stacked configuration until a predetermined stiffness is reached so as to form the rotor blade component. In addition, as shown in FIG. 14, the method 200 may include placing an intermediate layer 49 of material between one or more of the stacked solid pultruded composites 45.

Figure 15:
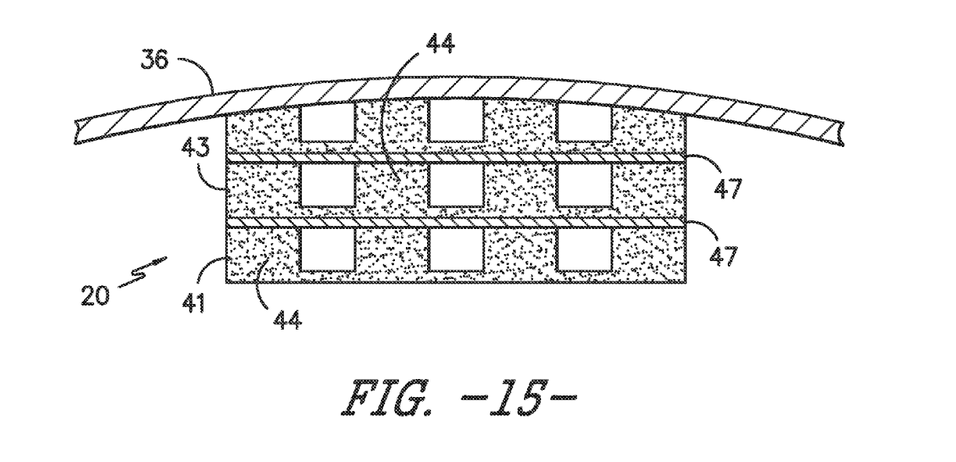
FIG. 15 illustrates a detailed, cross-sectional view of another embodiment of the spar cap of FIG. 6.

Referring now to FIG. 15, the step of arranging the plurality of pultruded composites 40 in the mold may also include (a) arranging a first pultruded composite 41 with the plurality of protrusions 44 in an upright position, (b) arranging a second pultruded composite 43 atop the first pultruded composite 41 in an upright position, and (c) repeating (a) through (b) until a predetermined stiffness is reached so as to form the rotor blade component. In addition, as shown, the method 200 may include placing one or more additional layers 47 between the stacked first and second pultruded components 41, 43.

Figure 16:
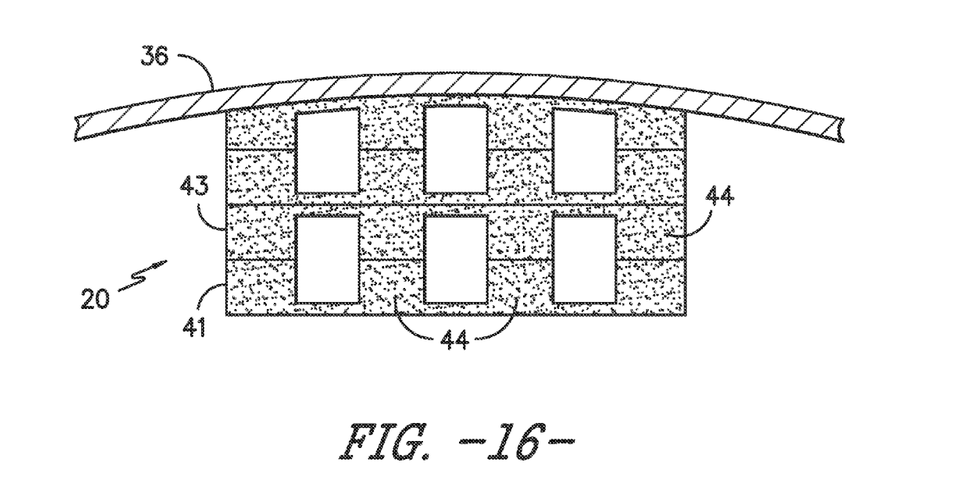
FIG. 16 illustrates a detailed, cross-sectional view of yet another embodiment of the spar cap of FIG. 6.

In addition, as shown in FIG. 16, the step of arranging the plurality of pultruded composites 40 in the mold may further include (a) arranging a first pultruded composite 41 with the plurality of protrusions 44 in an upright position, (b) arranging a second pultruded composite 43 atop the first pultruded composite in an opposite, downward position, and (c) repeating (a) through (b) until a predetermined stiffness is reached so as to form the rotor blade component.

Once the pultruded composites 40 are arranged, the composites 40 may also optionally be further secured together, for example, by vacuum infusion or by applying adhesive(s) between the pre-cured composites 40. More specifically, as shown at 210, the method 200 includes securing the plurality of pultruded composites 40 together within the mold so as to form the rotor blade component. For example, in certain embodiments, the pre-cured composites 40 may be secured together via vacuum infusion, adhesive, semi-preg material, pre-preg material, interference fit, or any other suitable joining method.

It should be understood that the pre-cured composites 40 as described herein may be constructed of any suitable composite materials. For example, in certain embodiments, the pre-cured composites 40 as described herein may be constructed of one or more fiber materials cured within at least one resin material. More specifically, the one or more fiber materials may include at least one of glass fibers, carbon fibers, metal fibers, polymer fibers, ceramic fibers, nanofibers, or combinations thereof. Further, the resin material may include at least one of a thermoplastic material or a thermoset material.

The thermoplastic materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. Further, the thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade component for a rotor blade of a wind turbine, the rotor blade component comprising:
    a plurality of pre-cured composites stacked atop each other, each of the plurality of pre-cured composites comprising:
        a continuous base portion comprising a first side and an opposing second side, the first side having a plurality of integral protrusions extending therefrom, wherein adjacent protrusions are separated by a gap, and
        a fabric layer attached to the second side of the continuous base portion opposite the plurality of integral protrusions,
    wherein, when the pre-cured composites are stacked together, a plurality of gaps are defined in the rotor blade component between at least one of the fabric layers of the plurality of pre-cured composites and the plurality of integral protrusions of an adjacent pre-cured composite.

2. The rotor blade component of claim 1, wherein the rotor blade component comprises at least one of a spar cap, or a shear web.

3. The rotor blade component of claim 1, wherein the pre-cured composite comprises a pultruded composite, the pultruded composite comprising one or more fiber materials cured within at least one resin material, the fabric layer being co-pultruded with the continuous base portion.

4. The rotor blade component of claim 3, wherein the one or more fiber materials comprises at least one of glass fibers, carbon fibers, metal fibers, polymer fibers, ceramic fibers, nanofibers, or combinations thereof.

5. The rotor blade component of claim 3, wherein the at least one resin material further comprises at least one of a thermoplastic material or a thermoset material.

6. The rotor blade component of claim 3, wherein the fabric layer is co-pultruded with the one or more fiber materials.

7. The rotor blade component of claim 1, further comprising a plurality of pre-cured composites arranged in a stacked configuration.

8. The rotor blade component of claim 1, wherein the protrusions are spaced equally apart and comprise an equal cross-sectional area.

9. The rotor blade component of claim 1, wherein the protrusions comprise at least one of the following cross-sectional shapes: square, rectangle, or dovetail.

10. A method of forming a rotor blade component of a wind turbine, the method comprising:

forming a plurality of pultruded composites wherein forming the plurality of pultruded composites comprises:

impregnating one or more fiber materials with a resin material;

co-pultruding a fabric layer with the impregnated fiber materials through a die having a predetermined die shape, the predetermined die shape configured to form a pultruded composite comprising a continuous base portion comprising a first side and an opposing second side, the first side having a plurality of protrusions extending therefrom, wherein adjacent protrusions are separated by a gap, the fabric layer being attached to the second side of the continuous base portion opposite the plurality of integral protrusions; and, curing the pultruded composite; and stacking the plurality of pultruded composites atop each other wherein when the pultruded composites are stacked together a plurality of gaps are defined in the rotor blade component between at least one of the fabric layers of the plurality of pultruded composites and the plurality of integral protrusions of an adjacent pultruded composite.

11. A method of manufacturing a rotor blade component of a wind turbine, the method comprising:

forming a plurality of pultruded composites, wherein forming the plurality of pultruded composites comprises:

impregnating one or more fiber materials with a resin material;

co-pultruding a fabric layer with the impregnated fiber materials through a die having a predetermined die shape so as to form a plurality of pultruded composites, the predetermined die shape configured to form a pultruded composite comprising a continuous base portion comprising a first side and an opposing second side the first side having a plurality of protrusions extending therefrom, wherein adjacent protrusions are separated by a gap, the fabric layer being attached to the second side of the continuous base portion opposite the plurality of integral protrusions; and, curing the pultruded composite;

arranging the cured pultruded composites in a mold of the rotor blade component wherein, when the pultruded composites are arranged together a plurality of gaps are defined in the rotor blade component between at least one of the fabric layers of the plurality of pultruded composites and the plurality of integral protrusions of an adjacent pultruded composite; and infusing the cured pultruded composites together within the mold so as to form the rotor blade component.

12. The method of claim 11, wherein the mold of the rotor blade component comprises at least one of a spar cap mold, a shear web mold, or an airflow modifying element mold.

13. The method of claim 11, wherein arranging the plurality of pultruded composites in the mold further comprises:

(a) arranging a first pultruded composite such that a plurality of protrusions of the first pultruded composite is in an upright position, (b) arranging a second pultruded composite atop the first ded composite such that a plurality of protrusions of the second pultruded composite is in an upright position, and (c) repeating (a) through (b) until a predetermined stiffness is reached so as to form the rotor blade component.

14. The method of claim 11, wherein arranging the plurality of pultruded composites in the mold further comprises:

(a) arranging a first pultruded composite such that a plurality of protrusions of the first pultruded composite is in an upright position, (b) arranging a second pultruded composite atop the first pultruded composite such that a plurality of protrusions of the second pultruded composite is in an opposite, downward position, and (c) repeating (a) through (b) until a predetermined stiffness is reached so as to form the rotor blade component.

15. The method of claim 11, further comprising placing an intermediate layer of material between one or more of the arranged pultruded composites.

16. The method of claim 11, wherein infusing the plurality of pultruded composites together within the mold so as to form the rotor blade component comprises vacuum infusion.

* * * * *